United States Patent [19]

Foster

[11] Patent Number: 5,137,541

[45] Date of Patent: Aug. 11, 1992

[54] POLISHING COMPOUNDS AND METHODS

[76] Inventor: John D. Foster, 3 Goleta Pt. Dr., Corona Del Mar, Calif. 91720

[21] Appl. No.: 671,191

[22] Filed: Mar. 18, 1991

[51] Int. Cl.$^5$ .............................................. B24D 17/00
[52] U.S. Cl. ........................................ 51/293; 51/296; 51/307; 51/308; 106/3
[58] Field of Search ................ 51/293, 296, 307, 308; 106/3

[56] References Cited

U.S. PATENT DOCUMENTS

| | | | |
|---|---|---|---|
| 2,921,839 | 8/1960 | Ritter | 23/182 |
| 3,538,230 | 7/1970 | Pader | 424/50 |
| 3,576,750 | 10/1971 | Muhler | 252/140 |
| 3,960,586 | 3/1976 | Wason | 106/288 B |
| 4,035,163 | 11/1977 | McLaughlin et al. | 51/303 |
| 4,181,633 | 2/1980 | Colodney et al. | 252/525 |
| 4,308,060 | 10/1981 | Talbot | 106/9 |
| 4,581,042 | 4/1986 | Willmore | 51/293 |
| 4,935,039 | 6/1990 | Miyazaki et al. | 51/293 |

*Primary Examiner*—William R. Dixon, Jr.
*Assistant Examiner*—Willie J. Thompson

[57] ABSTRACT

A method of cleaning and polishing a variety of porous and non-porous materials including porcelains, plastics, marble, glass, and finished wood. The polishing compound is comprised of an abrasive powder, an hydroflouric acid, and an organic solvent. The polishing compound is applied with a cloth and scouring of the surface to be cleaned and polished is accomplished with a soft cloth or with a polishing machine. The invention effectively removes scratches, stains, and blemishes from the surface to be polished and after scouring the result is a blemish free and polished surface.

5 Claims, No Drawings

POLISHING COMPOUNDS AND METHODS

BACKGROUND OF THE INVENTION

1. Field Of The Invention

This invention relates to the composition of substances and to a method of combining the substances whereby a smooth compound is formed having siginficantly superior qualities as a polishing compound particularly for porous surfaces such as porcelain and for materials such as fiberglass and plastics for which a high gloss finish is desired.

2. Description of the Prior Art

Many materials such as porcelains, fiberglass, and plastics are often produced with originally a high gloss finish. The glossy finish can add to the aesthetic appearance of the material when new and can aid in the cleaning of superficial soils or blemishes on the material. Often over a period of usage the glossy finishes become dull, scratched, stained, or otherwise blemished. A need exists for an effective polishing compound and method of removing blemishes such as scratches from the originally high gloss surface and restoring the original high glossy finish to worn materials without further scratching or damaging the worn material.

Numerous cleaning and polishing agents have been fabricated and generally include one or more abrasive substances in a liquid suspension or in the form of a paste. The abrasive substances used for polishing and cleaning include feldspar, punice, silica, emery, diatomaceous earth, jeweler's rogue and the like. These substances are suspended in or mixed with a carrier agent such as linseed oil, mineral oil, hydrocarbon oils, fish oil, and compounds of aluminum and silicon.

The polishing compounds in use at present are effective in cleaning hard, non-porous surfaces such as stainless steel and gemstones. However, present polishing compounds and methods do not satisfactorily clean and polish porous surfaces such as porcelain. Abrasives can actually scratch surfaces such as porcelain and fiberglass. A further disadvantage of the present polishing compounds and methods is that the polish usually reduces the amount of gloss on the surface of many materials such as porcelain, resulting in at best a satin finish. Thus after usage it may be necessary to replace stained materials such as bathtubs and statuary after the material has lost its original gloss and has become stained because present polishing compounds and methods will generally not restore the old material to its original high gloss fininsh as will the present invention.

Examples of conventional cleaning and polishing agents can be found in the prior art. McLaughlin, et al, in U.S. Pat. No. 4,035,163, discloses a method of cleaning and conditioning certain surfaces by the application of an alkaline composition with an abrasive powder. This composition, containing calcium metasilicate, will scratch or abrade many surfaces and will not produce a high gloss finish on most surfaces.

Ritter, in U.S. Pat. No. 2,921,839, disclosed a method of chemically producing small particles of silica material which is an advantage over producing the particles by a process of grinding but there is no disclosure or suggestion in the disclosure that the particles could be used for purposes of polishing.

Willmore in U.S. Pat. No. 4,581,042, disclosed a method of removing hard water buildup from surfaces and otherwise cleaning surfaces comprised of amixture of water, pumice or other abrasive, a bleaching or cleaning acid, a surfactant, a suspending material for the abrasive, that is pre mixed then used to remove the hard water buildup on the surfaces. However, this composition will not remove scratches from surfaces nor will it polish porcelains and the like to a high gloss finish.

Thus, the object of this invention is to provide a method of removing bleminshes and polishing porous and other fine materials to their original high gloss finish.

SUMMARY OF THE INVENTION

In general terms, the present invention is a method of removing scratches and other blemishes from porous and other surfaces and polishing the surface whereby a clean and glossy finish is produced on the surface of the material. The polishing compound used advantageously consists of more or less non abrasive particles in the form of a damp powder that effectively works as a scratch remover, cleaner, and polishing compound.

The polishing compound is prepared by using a container that is not labile to the acid used, in which is put an inorganic powder such as a silica compound, adding an organic solvent thereto, then adding hydroflouric acid. This produces a reaction resulting in a damp powder suspended in an acid carrier solution which may be used as a polishing compound without any further processing.

After the polishing composition is applied to the surface of the material to be polished a scouring action is applied to the surface using any material that is softer than the material being polished. The amount of pressure and the time required for polishing depends on the desired level of glossy finish to be produced. After polishing is completed, the polishing compound is removed from the surface by permitting the solvent to evaporate and either wiping away the powder residue or washing it off with water. The scouring can be done with a soft cloth with scouring in any direction. Alternatively, the scouring may be done with a polishing machine. The method can be used on a variety of materials advantageously including but not limited to porcelain, acrylics, fiberglass, marble, glass, and other plastic and metal materials.

DESCRIPTION OF THE PREFERRED EMBODIMENT

To further illustrate the advantages of the present invention an example will be given of the invention in its perferred embodiment.

The principal advantages of the present invention are that the method illustrated by way of example will effectively clean porous and non-porous surfaces without scratching the surface and at the same time produce a smooth surface with a high gloss finish. The method used consists of a polishing composition comprising an organic solvent, an inorganic acid, and abrasive particles and application to the material to be cleaned and polished. The materials which can be polished advantageously with the present invention include but are not limited to porcelains, tile, granite, marble, synthetic marble, fiberglass, glass, polycarbonate and other plastic surfaces, metals, painted surfaces, and the like. Thus, the present invention can be used to produce a clean and glossy finish to any smooth surface.

The polishing ability of the polishing compound depends on the relative hardness and size of the abrasive particles contained therein. It has been found that in order to produce a high gloss finish on most surfaces, a polishing compound having very small particles and with a hardness value greater than the material to be polished is desirable. Preferably, the particles have diameters as small as 0.1 micron or smaller than 500 microns. For most applications for which a high gloss finish is desired, the mean particle diameter is preferably smaller than 100 microns.

The organic solvent of the compound can comprise an alcohol such as methanol or ethanol, or any other volatile organic solvent such as ethane, or kerosene could be used. For best results the solvent should be capable of evaporating from the surface being cleaned and polished after the scouring is completed.

As a practical matter the strong inorganic acid must be hydrofluoric acid, except for unusual materials to be polished. In the preferred embodiment, hydroflouric acid is used. The strong inorganic acid is in a concentrated form more than 25% (w/v), with a preferable concentration of about 70% (w/v). When 70% (w/v) inorganic acid is used, the ratio of organic solvent to acid is approximately 2 to 1 respectfully.

In the preparation of the polishing compound, the acid and solvent are added to a container which is not labile to the acid used. The acid/solvent mixture is added to a powder, preferably a silicon compound. However, the compound can be produced from any number of other types of powders such as alumina-silica compounds, silica-stannic oxide, silica-ceria, silica-thoria, silica-alumina-ceria, and the like. In the preferred embodiment of the invention the powder used is Aerosil brand, available from Degussa. Aerosil brand powder is about 99.8% silicon dioxide with the remainder other oxide compounds.

To about 100 parts of the silica powder is added about 10 parts of the acid/solvent mixture which is preferably about 6 parts acid added to 12 parts solvent. The amount of each component may be varied to control the relative rate of abrasiveness of the resulting polishing compound. Upon the addition of the acid/solvent mixture to the silica powder a violent reaction occurs, resulting in the formation of a damp powder. A gas is produced in the reaction and when the reaction is complete the gas will stop forming. It is believed that the reaction results in reduction of the mean particle size of the Aerosil brand powder used. It is also believed that the reaction also increases the hardness of the particles produced and that by increasing the concentration of inorganic acid the violence of the reaction is increased which produces finer and harder particles.

One advantage of the present invention is that the particles produced in the reaction are believed to be or tend to be of uniform size and shape whereby the ability of the particles to produce a high gloss finish is enhanced.

The reaction produces a damp powder which may be used as a polishing compound without any further processing unless further processing is desirable. It is possible to pass the damp powder produced in the reaction through a sieve to remove any unduly large particles. Also the solvent or some of the solvent can be allowed to evaporate or water can be added to produce a compound of any desired consistency and viscosity, for example.

In order to polish a surface using the preferred embodiment of the invention, the polishing compound is applied to the surface to be polished. Preferably, the person applying the polish will wear gloves such as latex gloves and avoid skin contact with the polishing compound to avoid any reaction from the high acidity of the compound. The compound can be advantageously applied by any material of hardness less than the hardness of the surface to be polished. For example, application of the compound to the surface to be polished can be by the gloved hand, preferably by application using a soft cloth.

It is believed that the acid in the composition removes a thin layer from the surface of the surface of the material to be polished or that it changes the molecular structure of the surface of the material. Preferably not more than the top one or two microns of the surface of the material are removed.

After application of the compound to the surface of the material a scouring action is used to produce the desired clean and polished surface. It is an advantage of the present invention that no waiting period is required between application of the polishing compound and the initiation of scouring. The amount of pressure applied during scouring and the length of time required will depend on the material being polished, the amound of damage to the surface being polished, and the level of glossy finish desired. Advantageously, the scouring may be done using any material less hard than the material being polished. A soft cloth such as a felt cloth can be used for scouring. Preferably, the scouring action is in a rotary direction for producing the best shine. Where a greater scouring action is required, a polishing machine may be used such as a rotary polisher fitted with an attachment having a covering or scouring surface less hard than the surface being polished. A person with skill in the art would realize that there are a variety of polishing machines that could be used to provide the scouring action.

After scouring unitl the desired gloss finish is produced the polishing compound is removed from the surface. One method of removing the composition is to allow the volatile solvent in the composition to evaporate then simply brushing or wiping away the powder residue. The evaporation of the solvent can be speeded up for example by heating the surface of the material. However, sufficient heat is produced as the natural by product of scouring the surface. In the alternative the polishing compound can be removed simply by washing the compound off the polished surface with ordinary water or with additional solvent. This procedure results in a surface which has a brilliant finish with the desired level of gloss.

Although it is not intended that the scope of the present invention be limited thereby, the following example will specifically point out how the preferred embodiment of the invention may be produced.

EXAMPLE ONE

Two cups of methanol were added to a three liter reaction flask, to which is added one cup of 70% hydroflouric acid. This mixture was then added to another three liter reaction flask which contained two to four ounces of Aerosil brand silica powder. A violent reaction occurred and a gas produced. The reaction flask was agitated or stirred until gas stopped forming. A damp powder residue was produced which was used as a polishing compound without any further treatment.

EXAMPLE TWO

A rough cut one foot by one foot piece of natural marble was found lacking any gloss and contains many scratches. The compound produced in example one was applied to one side of the marble using a felt cloth. The compound is then rubbed and the material scoured with the same felt cloth. Circular motions are used, applying relatively even pressure over the entire side of the marble. This scouring motion was continued for approximately five minutes. The powder residue was then wipped away. This produced a polished surface with a brilliant, smooth, high gloss finish with no visible scratches.

This illustrates some of the advantages of the present invention namely the production of a clean surface, a surface polished to a high gloss, and a blemish free surface so that it is difficult to tell that the polished material was ever blemished and had lost its gloss. The foregoing is intended for purposes of illustration only and not to limit the scope of the invention.

I claim:

1. A method of cleaning and polishing dull or blemished porous and non-porous surfaces comprising:
   (a) applying to the surface to be cleaned and polished a polishing compound prepared by a method comprising:
   providing a container not labile to the acid used;
   adding an abrasive powder to the container;
   adding an organic solvent to the container;
   adding hydrofluoric acid to the container to produce a reaction which forms a gas and a damp powder residue which can be used as a polishing compound without any further processing;
   (b) application of a scouring action to the surface using the polishing compound; and
   (c) removal of the polishing compound from the cleaned and polished material.

2. The method of claim 1 where the abrasive powder used is a silica based powder.

3. The method of claim 1 where the surface is comprised of a material selected from the group of porous substances consisting of: porcelain, fiberglass, acrylics, granite, marble, synthetic marble, and finished wood.

4. A method of preparing a polishing compound comprising:
   (a) providing a container not labile to the acid used;
   (b) adding an abrasive powder to the container;
   (c) adding an or solvent to the container; and
   (d) adding a hydroflouric acid to the container to produce a reaction which forms a gas and a damp powder residue which can be used as a polishing compound without any further processing.

5. The method of claim 4 where the abrasive powder used is a silica based powder.

* * * * *